(12) United States Patent
Abdo et al.

(10) Patent No.: US 12,250,657 B2
(45) Date of Patent: Mar. 11, 2025

(54) CONSTRUCTION OF A UWB ANCHOR REPOSITORY

(71) Applicant: SAGEMCOM BROADBAND SAS, Rueil Malmaison (FR)

(72) Inventors: Alexandre Abdo, Rueil Malmaison (FR); Pierre Sabatier, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 18/339,884

(22) Filed: Jun. 22, 2023

(65) Prior Publication Data

US 2023/0422203 A1 Dec. 28, 2023

(30) Foreign Application Priority Data

Jun. 22, 2022 (FR) .................................. FR2206198

(51) Int. Cl.
*H04W 64/00* (2009.01)
*G01S 13/02* (2006.01)

(52) U.S. Cl.
CPC ......... *H04W 64/00* (2013.01); *G01S 13/0209* (2013.01)

(58) Field of Classification Search
CPC ............................ H04W 64/00; G01S 13/0209
See application file for complete search history.

(56) References Cited

U.S. PATENT DOCUMENTS

| | | |
|---|---|---|
| 2021/0088616 A1 | 3/2021 | Hsieh |
| 2022/0137176 A1 | 5/2022 | Silverman et al. |
| 2022/0244367 A1* | 8/2022 | Shin ........................ G01S 11/04 |
| 2022/0283321 A1* | 9/2022 | Ng .............................. G01S 5/14 |
| 2022/0397657 A1* | 12/2022 | Sabatier .................. G01P 15/14 |
| 2023/0071554 A1* | 3/2023 | Zhang ................... G01S 13/765 |

FOREIGN PATENT DOCUMENTS

CN 109246606 B * 11/2020 ............ H04W 4/021

* cited by examiner

*Primary Examiner* — Muthuswamy G Manoharan
(74) *Attorney, Agent, or Firm* — MUNCY, GEISSLER, OLDS & LOWE, P.C.

(57) ABSTRACT

The method for positioning an anchor B in a system RA defined by an anchor A, the anchor A and the anchor B being outside of UWB range from one another, but in Wi-Fi range, the positioning method using mobile equipment (2) comprising a UWB communication module (5) and a Wi-Fi communication module (10). The measuring method include the steps of: evaluating, by using UWB signals, a position $P_{MA}$ of the mobile equipment (2) in the system RA; evaluate a position $P_B$ of the anchor B, by using UWB signals, if the mobile equipment (2) is located in UWB range of the anchor B, or by alternatively using Wi-Fi signals; deduce from the position $P_{MA}$ and from the position $P_B$, a position $P_{BA}$ of the anchor B in the system RA.

13 Claims, 4 Drawing Sheets

CONSTRUCTION OF A UWB ANCHOR REPOSITORY

The invention relates to the field of geolocation using UWB technology.

BACKGROUND OF THE INVENTION

UWB (Ultra-Wide Band) technology, makes it possible in particular to locate internally, extremely accurately, mobile equipment, for example a smartphone, a smartwatch, a tablet, etc.

The UWB location requires to create a positioning repository which is defined by a plurality of UWB anchors having fixed positions. The UWB anchors are possibly—but not necessarily—integrated in equipment capable of performing other functions, and for example, in smart speakers, computers, etc.

When the UWB anchors are in UWB range of one another, i.e. when each UWB anchor is located in the coverage zones of the other UWB anchors, the anchors are capable of being automatically positioned against one another and the creation of the positioning repository does not pose any problems. However, when two UWB anchors are not in UWB range of one another, they are incapable of accurately knowing the distance which separates them, and the positioning repository cannot be automatically constructed.

OBJECT OF THE INVENTION

The invention aims to position one against the other, automatically, two UWB anchors which are not in UWB range of one another.

SUMMARY OF THE INVENTION

In view of achieving this aim, a method for positioning an anchor B in a system RA defined from a position of an anchor A, the anchor A and the anchor B being UWB anchors, which each comprise a UWB communication module, which are each integrated in equipment comprising a Wi-Fi communication module, and which are in Wi-Fi range of one another, the positioning method using mobile equipment comprising a UWB communication module and a Wi-Fi communication module, and which is located in UWB range at least of the anchor A and in Wi-Fi range of the anchor A and of the anchor B, the positioning method comprising the steps of:
evaluating, by the equipment integrating the anchor A, by using first UWB signals, a position $P_{MA}$ of the mobile equipment in the system RA;
evaluating, by the equipment integrating the anchor A and/or by the equipment integrating the anchor B and/or by the mobile equipment, a position $P_B$ of the anchor B, by using second UWB signals if the mobile equipment is located in UWB range of the anchor B, or by alternatively using Wi-Fi signals;
deducing from the position $P_{MA}$ and from the position $P_B$, a position $P_{BA}$ of the anchor B in the system RA.

The positioning method according to the embodiments therefore uses mobile equipment, located in UWB range of the anchor A, to obtain the position of the anchor B in the system RA.

If the mobile equipment is not located in UWB range of the anchor B, the position of the anchor B is obtained by using Wi-Fi signals.

Thus, the anchor A and the anchor B are not in UWB range of one another, but the positioning method makes it possible to fill this gap and to accurately position the anchor B with respect to the anchor A by combining UWB technology with Wi-Fi technology.

In addition, a positioning method such as described above is proposed, wherein the system RA is a polar system having as a pole, the anchor A, and wherein the position $P_{MA}$ is a polar position, the equipment integrating the anchor A being arranged to determine polar coordinates of the mobile equipment in the system RA, and to evaluate the position $P_{MA}$ from said polar coordinates.

In addition, a positioning method such as described above is proposed, wherein, if the mobile equipment is located in UWB range of the anchor B, the position $P_B$ is a polar position $P_{MB}$ in a system RM which is a polar system having as a pole, the mobile equipment, this being arranged to determine polar coordinates of the anchor B in the system RM, and to evaluate the position $P_{MB}$ from said polar coordinates.

In addition, a positioning method such as described above is proposed, comprising the step, to obtain the position $P_{BA}$, to determine polar coordinates $(AB;\theta(N_A,AB))_{RA}$ of the anchor B in the system RA.

In addition, a positioning method such as described above is proposed, wherein, if the mobile equipment is not located in UWB range of the anchor B, the determination of the position $P_B$ comprises the steps of:
measuring a distance $dist_{AB}$ between the anchor A and the anchor B by the equipment integrating the anchor A or by the equipment integrating the anchor B, by using the first Wi-Fi signals;
measuring une distance $dist_{MB}$ between the mobile equipment and the anchor B by the mobile equipment, by using second Wi-Fi signals;
evaluating the position $P_B$ from the distance $dist_{AB}$ and from the distance $dist_{MB}$.

In addition, a positioning method such as described above in proposed, wherein evaluating the position $P_B$ comprises the steps of:
determining Cartesian coordinates of the mobile equipment in a Cartesian system having the anchor A as the origin;
calculating, by using the Cartesian coordinates of the mobile equipment, the intersection point between:
a first circle having, as the centre, the position of the anchor A and, as the radius, the distance $dist_{AB}$;
a second circle having, as the centre, the position of the mobile equipment and, as the radius, the distance $dist_{MB}$;
a third circle having, as the centre, a new position of the mobile equipment following a movement of the mobile equipment, and, as the radius, a new distance $dist'_{MB}$ between the mobile equipment and the anchor B following the movement of the mobile equipment.

In addition, a positioning method such as described above is proposed, wherein the distance $dist_{AB}$ and the distance $dist_{MB}$ are estimated from respective RSSI measurements.

In addition, a positioning method such as described above is proposed, wherein each UWB communication module comprises two antennas, said UWB communication module thus being capable of measuring an angle between a straight line passing through said UWB communication module and another UWB communication module, and between a straight line orthogonal to a plane wherein said antennas extend, said angle forming an angular coordinate of the other UWB communication module in a polar system having, as a pole, said UWB communication module.

In addition, electrical equipment comprising an anchor A, a Wi-Fi communication module, and a processing unit are proposed, the anchor A being a UWB anchor, the processing unit being arranged to:
evaluate, by using first UWB signals, a position $P_{MA}$ of mobile equipment in a system RA defined from a position of the anchor A, the mobile equipment being able to comprise a UWB communication module and a Wi-Fi communication module and could be located in UWB range of the anchor A and in Wi-Fi range of the anchor A;
evaluate, by the equipment integrating the anchor A and/or by equipment integrating an anchor B and/or by the mobile equipment, a position $P_B$ of the anchor B, which is also a UWB anchor and which is in Wi-Fi range of anchor A, by using second UWB signals if the mobile equipment is located in UWB range of the anchor B, or by alternatively using Wi-Fi signals;
deduce from the position $P_{MA}$ and from the position $P_B$, a position $P_{BA}$ of the anchor B in the system RA.

In addition, electrical equipment such as described above is proposed, the electrical equipment being a Wi-Fi extender.

In addition, electrical equipment such as described above is proposed, the electrical equipment being a residential gateway.

In addition, mobile equipment comprising a UWB communication module, Wi-Fi communication module, and a processing unit, and which is located in UWB range at least of an anchor A and in Wi-Fi range of the anchor A and of an anchor B is proposed, the anchor A and the anchor B being UWB anchors, the processing unit being arranged to:
evaluate, by equipment which could integrate the anchor A, by using first UWB signals, a position $P_{MA}$ of the mobile equipment in a system RA defined from a position of the anchor A;
evaluate, by the equipment which could integrate the anchor A and/or by equipment which could integrate the anchor B and/or by the mobile equipment, a position $P_B$ of the anchor B, by using second UWB signals if the mobile equipment is located in UWB range of the anchor B, or by alternatively using Wi-Fi signals;
deduce from the position $P_{MA}$ and from the position $P_B$, a position $P_{BA}$ of the anchor B in the system RA.

In addition, mobile equipment such as described above is proposed, the mobile equipment being a smartphone.

In addition, equipment comprising a processing unit is proposed, arranged to:
evaluate by equipment which could integrate an anchor A, by using first UWB signals, a position $P_{MA}$ of mobile equipment in a system RA defined from a position of the anchor A;
evaluate, by the equipment which could integrate the anchor A and/or by equipment which could integrate an anchor B and/or by the mobile equipment, a position $P_B$ of the anchor B, by using second UWB signals, if the mobile equipment is located in UWB range of the anchor B, or by alternatively using Wi-Fi signals;
deduce from the position $P_{MA}$ and from the position $P_B$, a position $P_{BA}$ of the anchor B in the system RA, the anchor A and the anchor B being UWB anchors which can be in Wi-Fi range of one another,
the mobile equipment being able to comprise a UWB communication module and a Wi-Fi communication module, and being able to be located in UWB range at least of the anchor A and in Wi-Fi range of the anchor A and of the anchor B.

In addition, a computer program comprising instructions is proposed which make the processing unit of the equipment such as described above execute the steps of the positioning method such as described above.

In addition, a recording medium is proposed which can be read by a computer on which the computer program is recorded such as described above.

The invention will be best understood in the light of the description below of a particular, non-limiting embodiment of the invention.

BRIEF DESCRIPTION OF THE DRAWINGS

Reference will be made to the accompanying drawings, among which.

DETAILED DESCRIPTION OF THE INVENTION

The invention aims to automatically create a positioning repository making it possible to implement an indoor location which uses UWB technology.

Figure 1:
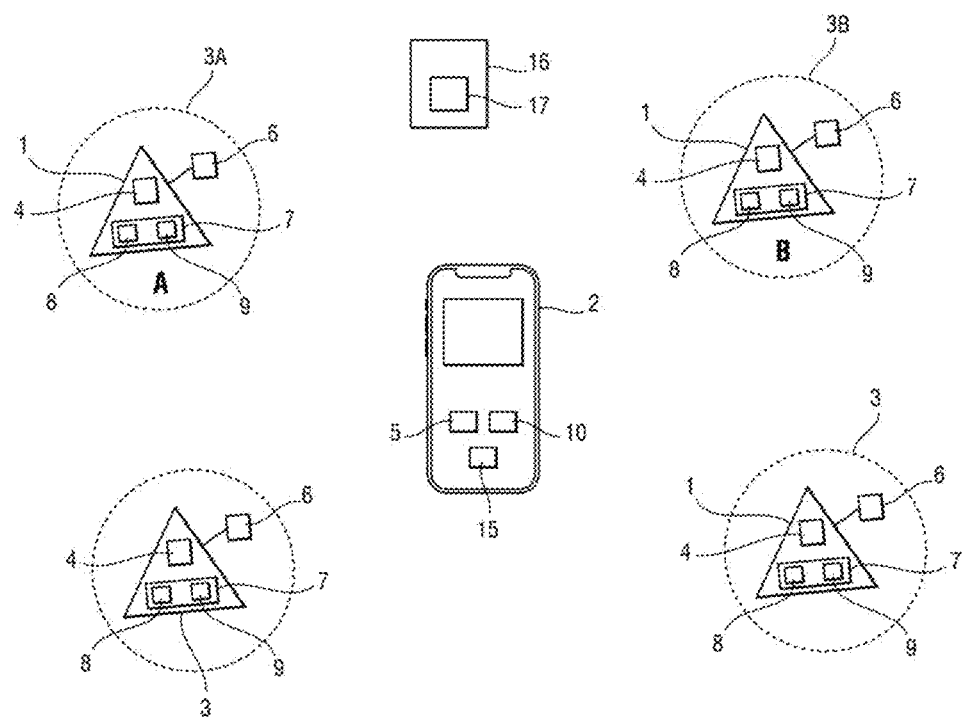
FIG. 1 represents UWB anchors and a smartphone.

In reference to FIG. 1, the positioning repository is defined by a plurality of UWB anchors 1 and can be used to geolocate mobile equipment 2, which is, in this case, for example, a smartphone.

The UWB anchors 1 can be integrated in distinct individual equipment, only fulfilling this anchor function. However, in this case, each UWB anchor is integrated in distinct equipment 3 fulfilling at least one other function. The equipment 3 comprises, for example, one or more Wi-Fi-extenders, one or more access points, one or more residential gateways, one or more smart speakers, one or more voice assistants, one or more set-top boxes, etc.

Each UWB anchor 1 integrates a UWB communication module 4, which is, for example, the DECAWAVE DW3000 component. The communication module 4 comprises two antennas.

The smartphone 2 itself also comprises a UWB communication module 5, which is, for example, similar to that of the UWB anchors 1.

The way in which the geolocation of the smartphone 2 operates is briefly described.

UWB is a radio technology enabling measurements of distances and angles between two pieces of transceiver equipment.

The measurement of the distance between the two pieces of equipment can be obtained by the ToF (Time of Flight)

technique, which consists of measuring the propagation time of a broadband pulsed radioelectric signal. This signal has the property of travelling in a straight line and of avoiding obstacles of an environment encountered in a house, or, more generally, in any building.

Knowing the speed of an electromagnetic wave (and therefore of the radioelectric signal), and this propagation time, it is possible to determine the distance between the two pieces of equipment.

Therefore, an established network of fixed points (the UWB anchors 1) is used, which forms a positioning repository, and the smartphone 2 is specifically located in an absolute position with respect to said positioning repository.

The position of the smartphone 2 is located at the intersection of the spheres centred on each UWB anchor 1. The radius of a sphere centred on a UWB anchor 1 corresponds to the distance, calculated from the time of flight of the UWB signal, between the smartphone 2 and said UWB anchor 1.

Determining the intersection point of the spheres makes it possible to know the position of the smartphone 2.

Figure 2:
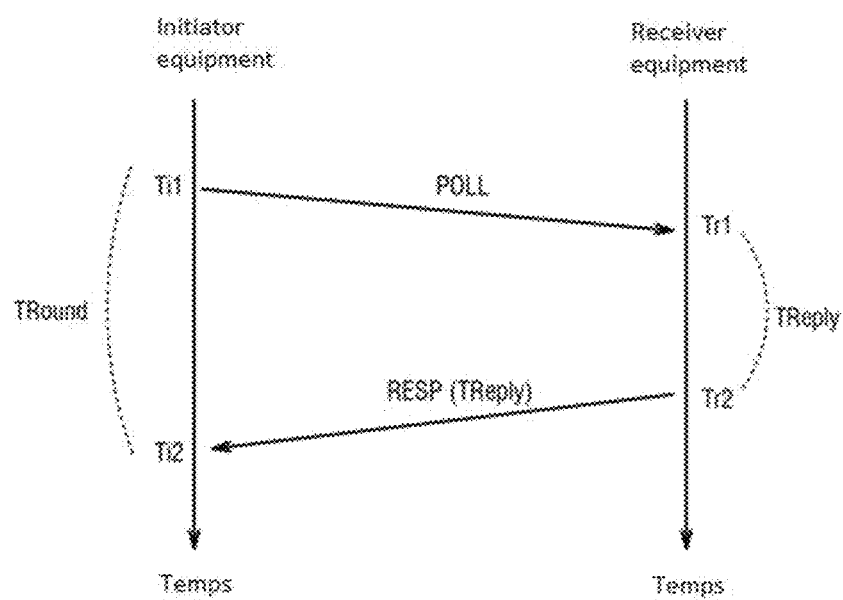
FIG. 2 illustrates the Two Way Ranging method.

This ToF technique can be performed by using the TWR (Two Way Ranging) method. In reference to FIG. 2, in this method, initiator equipment sends a first message "POLL", and receiver equipment responds, a specific time after the emission, by emitting a second message "RESP". The initiator equipment thus subtracts, at the time TRound between the emission of the first message and the receipt of the second message, the response time TReply (known) of the receiver equipment.

The initiator equipment thus obtains the propagation time of two waves. The initiator equipment thus calculates:

$$ToF = \frac{(T\ Round - T\ Reply)}{2}$$

The distance between the initiator equipment and the receiver equipment is obtained by the formula:

Distance=ToF×c (where c is speed).

It has been seen that the UWB communication modules 4, 5 each comprise two antennas.

Figure 3:
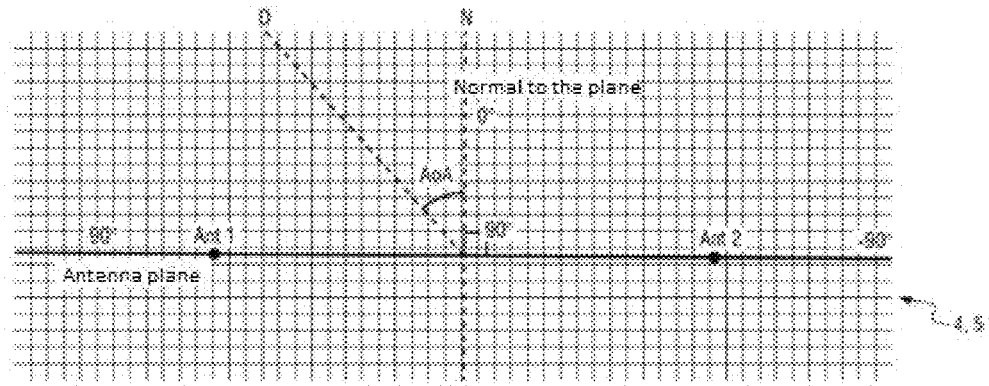
FIG. 3 represents the two antennas of a UWB communication module, and the straight line normal to the module.

In reference to FIG. 3, each UWB communication module 4 or 5 of equipment (anchor or smartphone) is therefore capable of measuring the angle of arrival (AoA), which is the angle between:

the straight line D connecting said UWB communication module and another UWB communication module of another piece of equipment;

the straight line N normal to said UWB communication module, i.e. an imaginary straight line orthogonal to the plane wherein the two UWB antennas Ant1, Ant2 of said UWB communication module extend.

This angle AoA is calculated thanks to a measurement of the phase shift of the carrier of the signal received between the two antennas Ant1, Ant2, or PDoA (Phase Difference of Arrival). This phase shift corresponds to a small difference in distance between the measurement of distance obtained via an antenna Ant1 and the measurement of distance obtained via the other antenna Ant2.

The PDoA is linked to the angle of arrival (AoA) by this equation:

$$AoA = \arcsin\left(\frac{PDoA \times \lambda}{2\pi d}\right)$$

where:

$\lambda$ is the wavelength of the carrier of the UWB signal;

d is the distance between the antennas Ant1, Ant2.

The positioning repository is now interesting again.

Among the UWB anchors, an anchor A and an anchor B are located.

It is considered that the anchor A and the anchor B have fixed positions. Naturally, the positions of the anchor A and of the anchor B can be modified (in particular, if they are integrated in mobile equipment such as a portable speaker)—in this case, a positioning repository can be created again. The positioning method described in this case, is therefore implemented, while the positions of the anchor A and of the anchor B do not vary. In an example, the positions of the anchor A and of the anchor B do not vary for a time duration corresponding to the time necessary for the exchange and for the processing of UWB signals and/or Wi-Fi signals. In another example, the positions of the anchor A and of the anchor B do not vary during a time duration corresponding to the movement time of the smartphone 2. This duration can be, for example, in the order of magnitude of one minute.

In an embodiment, the anchor A and the anchor B are positioned in UWB range of one another. The smartphone 2 thus engages with the anchors to specifically determine the distance between the anchor A and the anchor B and to absolutely position the anchor A and the anchor B.

In another embodiment, the anchor A and the anchor B are positioned out of UWB range of one another: the anchor A does not belong to the UWB coverage zone of the anchor B, and/or the anchor B does not belong to the coverage zone of the anchor A. Consequently, UWB technology cannot be used to specifically and directly determine the distance between the anchor A and the anchor B, and to absolutely position the anchor A and the anchor B.

The anchor A is integrated in equipment 3A. The anchor B is integrated in equipment 3B.

The equipment 3A, 3B, wherein the anchors A and B are respectively integrated, each comprise a wireless communication module operating, for example, according to one of the standards of the standard family 802.11 of the Institute of Electrical and Electronics Engineers "IEEE", like for example, the standard IEEE 802.11ax, also referenced under the name Wi-Fi 6. Therefore, the "Wi-Fi 6 communication module" will be referred to. In the terms, "Wi-Fi technology", "Wi-Fi communication(s)", "Wi-Fi range", "Wi-Fi signals", "Wi-Fi extender", etc., a reference to one of the standards 802.11 a/b/g/n/ac/ax/be, as well as to the standard 802.11 such as defined by the IEEE is understood by the reference "Wi-Fi".

In this case, the anchor A and the anchor B are each integrated in a (distinct) Wi-Fi extender.

The anchor A and the anchor B are in Wi-Fi range of one another.

Embodiments make it possible to overcome the absence of a UWB functional link between the anchor A and the anchor B by using Wi-Fi technology, which enables the obtaining of distance information between the two anchors.

First, the way in which a distance can be estimated between two pieces of equipment, each provided with a Wi-Fi communication module can be rapidly described.

Wi-Fi technology is a radio technology used for the transfer of data.

It is possible to estimate distances via Wi-Fi technology by using the RSSI (Received Signal Strength Indicator) metric.

Indeed, this measurement depends on the power emitted, on the gain from the antennas of the emitter equipment and of the receiver equipment, as well as the distance D separating them, according to the free space attenuation rules. The following equation is obtained:

$$D = 10^{\frac{FSPL-K-20 \times \log(f)}{20}}$$

where:
D is the distance in metres;
k=−27,55;
f is the frequency in MHz of the Wi-Fi signal;
FSPL is the free space path loss, which can be estimated according to the function:

FSPL=Ptx−Cltx+Agtx30 Agrx−Clrx−Prx−Fm where:
Ptx is the power emitted;
Agtx,Agrx are the respective gains of the antenna of the emitter equipment and of the receiver equipment;
Prx is the power received (estimated via the RSSI);
Cltx,Clrx are the cable losses;
Fm is a margin for protection against fading.

It is noted that this measurement can be replaced by one of the methods defined in the standard 802.11az belonging to the standard family IEEE 802.11 and certified by the Wi-Fi Alliance under the name Wi-Fi location.

This standard proposes to measure the ToF of the Wi-Fi signals similarly to the method using the UWB, via exchanges of the "round-trip measurements" type. This method operates almost identically to the TWR. These measurements would be taken in "burst" form, to obtain a more reliable measurement of distance.

An embodiment is, in this case, implemented in the anchor A.

The anchor A integrates a processing unit 7. The processing unit comprises one or more processing components 8, and for example, any processor or microprocessor, general or specialised (for example, a DSP (Digital Signal Processor), a microcontroller, or a programmable logic circuit, such as an FPGD (Field Programmable Gate Array) or an ASIC (Application Specific Integrated Circuit). The processing unit also comprises one or more memories 9. At least one of these memories forms a recording medium which can be read by a computer, on which at least one computer program is recorded, comprising instructions which make the processing unit 7 execute at least some of the steps of the positioning method according to the embodiments.

In this case, it is assumed (even if this is not necessary) that each of the UWB anchors 1 integrates a processing unit 7 similar to that which has just been described.

The positioning method uses mobile equipment, for example the smartphone 2, which, as has been seen, itself also comprises a UWB communication module 5, and which moreover also comprises a Wi-Fi communication module 10. The position of the smartphone 2 can naturally vary with respect to the anchors A and B. The respective positions of the anchor A, the anchor B and the smartphone 2 are named A, B, M.

It is assumed that the respective ranges of these radios are symmetrical: the anchor A located in the UWB (respectively Wi-Fi) coverage zone of the smartphone 2 is equivalent to the fact that the smartphone 2 is located in the UWB (respectively Wi-Fi) coverage zone of the anchor A.

Indeed, concerning Wi-Fi technology, appliances using this technology must be capable of communicating data with one another, the equipment is therefore systematically in range of one another.

Concerning UWB technology, the measurements of distance via ToF measurements require, as a minimum, two messages going in two directions (from the anchor to the smartphone, then from the smartphone to the anchor, for example).

By being based on this information, it is possible to obtain from the smartphone 2, at each moment, by means of Wi-Fi technology, the RSSI level corresponding to its vision of each of the anchors A and B (respectively $RSSI_{MA}$ and $RSSI_{MB}$). It is also possible to obtain the RSSI corresponding to the mutual vision of the anchors with one another ($RSSI_{AB}$).

It is therefore possible, by using Wi-Fi technology, to measure the distance $dist_{MA}$ between the smartphone 2 and the anchor A, the distance $dist_{MB}$ between the smartphone 2 and the anchor B, and the distance $dist_{AB}$ between the anchor A and the anchor B.

As has been seen, $dist_{MA}$ is estimated from $RSSI_{MA}$, $dist_{MB}$ is estimated from $RSSIi_{MB}$, and $dist_{AB}$ is estimated from $RSSI_{AB}$.

In the same way, it is possible to obtain from the smartphone 2, by means of UWB technology, the absolute distance separating the smartphone 2 of each of the anchors A, B ($Dist_{MA}$ and $Dist_{MB}$)—on the condition that the smartphone 2 is in UWB range of said anchors. It is also possible to obtain the absolute angle of arrival of the signal coming from the smartphone 2 on each of the anchors A, B ($Angle_{MA}$ and $Angle_{MB}$)—on the condition that the smartphone 2 is in UWB range of said anchors.

Reciprocally, it is possible to know the angles measured by the smartphone 2 via UWB technology ($Angle_{AM}$ and $Angle_{BM}$)—on the condition that the smartphone 2 is in UWB range from said anchors.

For a pair of equipment X, Y, by "$Angle_{xy}$", this means the angle between the straight line connecting the UWB communication modules of the equipment X and Y, and the straight line normal to the UWB communication module integrated in the equipment Y (see explanations provided above).

It is also noted that the term $Dist_{XY}$ is used for the distance between the equipment X and Y when it is measured by using UWB technology, and the term $dist_{XY}$ when it is measured by using Wi-Fi technology.

It is assumed that the smartphone 2 is located in UWB range at least of the anchor A and in Wi-Fi range of the anchor A and of the anchor B.

Figure 4:
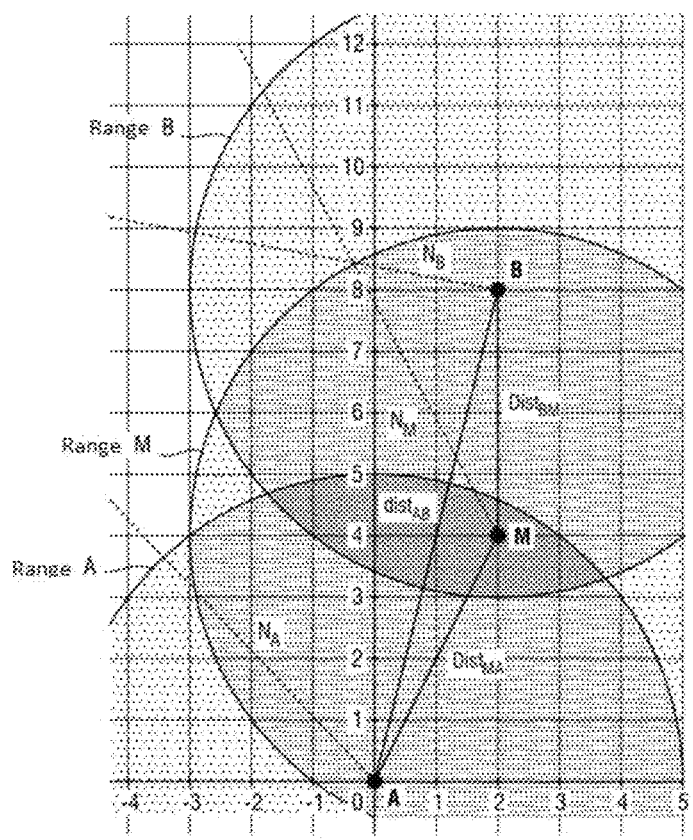
FIG. 4 represents the anchor A, the anchor B and the smartphone, while this is in UWB range of the anchor A and of the anchor B.

First, in reference to FIG. 4, the implementation of the positioning method is described, in the case where the smartphone 2 is located both in UWB range of the anchor A and of the anchor B.

Range A, the UWB range of anchor A, Range B, the UWB range of anchor B, and Range M, the UWB range of the smartphone 2 are noted, in FIGS. 4 to 7.

It is therefore possible, by using UWB technology, to measure: the distance Dist between the smartphone 2 and the anchor A, the distance $Dist_{MB}$ between the smartphone 2 and the anchor B, as well as the angles $Angle_{MA}$, $Angle_{MB}$, $Angle_{AM}$ and $Angle_{BM}$.

It is also possible, by using Wi-Fi technology, to measure the distance $dist_{MA}$ between the smartphone 2 and the anchor A, the distance $dist_{AB}$ between the smartphone and the anchor B, and the distance $dist_{AB}$ between the anchor A and the anchor B.

These measurements make it possible to produce polar coordinates.

The processing unit 7 of the equipment 3A, and therefore of the anchor A, therefore evaluates, by using first UWB signals, a position $P_{MA}$ of the smartphone 2 in a system RA which is defined from the position of the anchor A. The system RA is, in this case, a polar system having as a pole (origin), the anchor A.

The position $P_{MA}$ is therefore a polar position. The anchor A determines the polar coordinates of the smartphone 2 in the system RA, then evaluates the position $P_{MA}$ from said polar coordinates.

The polar coordinates of the smartphone 2 are formed by the pair: $(AM, \theta(N_A, AM))_{RA}$.

AM is therefore the radial coordinate of the smartphone 2 in the system RA and is equal to $Dist_{MA}$.

$\theta(N_A, AM)$ is the angular coordinate of the smartphone 2 in the system RA, which is equal to the angle between the straight line (AM) and the polar axis $N_A$ (corresponding to the straight line normal to the UWB communication module of the anchor A), and therefore to $Angle_{MA}$.

It is noted that it is possible to convert these polar coordinates into Cartesian coordinates in a system having, the position of the anchor A as the origin.

A polar system makes it possible characterise a position thanks to a distance with respect to a point of origin, and an angle with respect to an axis passing through this point.

The polar coordinates are written: $(\rho, \theta)$
where:
$\rho$ is the radial coordinate, i.e. the distance with respect to the pole of the system;
$\theta$ is the angular coordinate, i.e. the angle with the polar axis.

By considering that the polar axis corresponds to the abscissa axis, and that the ordinate axis has a directional angle of 90°, the conversion of polar coordinates into Cartesian coordinates is done as follows:

$$X = \rho \times \cos(\theta)$$

$$Y = \rho \times \sin(\theta)$$

The smartphone 2 can measure the distances $Dist_{MA}$ and $Dist_{MB}$, as well as the angles $Angle_{AM}$ and $Angle_{BM}$. This information forms polar positions around M. According to the method defined above, it is possible to convert these positions in the system RM into positions in the system RA, and therefore extend the system of A to the coverage zone M.

Then, the processing unit 7 of the anchor A evaluates, by the equipment 3A integrating the anchor A and/or by the equipment 3B integrating the anchor B and/or by the smartphone 2, a position $P_B$ of the anchor B, by using second UWB signals if the smartphone 2 is located in UWB range of the anchor B, or by alternatively using Wi-Fi signals.

In this case, the processing unit 7 evaluates a position $P_B$ of the anchor B, by the smartphone 2, by using second UWB signals.

The position $P_B$ is, in this case, a polar position $P_{MB}$ in a system RM which is a polar system having, as a pole, the point M (the position of the smartphone 2).

The smartphone 2 determines the polar coordinates of the anchor B in the system RM, then evaluates the position $P_{MB}$ from said polar coordinates.

The polar coordinates of the anchor B in the system RM are formed by the pair: $(MB, \theta(N_M, MB))_{RM}$.

MB is therefore the radial coordinate of the anchor B in the system RM, and is equal to $Dist_{BM}$.

$\theta(N_M, MB)$ is the angular coordinate of the anchor B in the system RM, which is equal to the angle between the straight line (MB) and the polar axis $N_M$ (corresponding to the straight line normal to the UWB communication module of the smartphone), and therefore to $Angle_{BM}$.

Again, it is possible to convert these polar coordinates into Cartesian coordinates in a system having the smartphone 2 as the origin.

Then, the processing unit 7 of the anchor A converts the polar position of the anchor B in the system RM, into a polar position of the anchor B in the system RA, by performing a polar-polar system conversion.

It is known that the polar position M of the smartphone 2 in the systems RA then RM is such that:

$$M = (AM; \theta(N_A, AM))_{RA} = (0;0)_{RM}$$

The polar position A of the anchor A in the systems RA then RM is such that:

$$A = (0;0)_{RA} = (AM; \theta(N_M, MA))_{RM}$$

The polar position B of the anchor B in the systems RA then RM is such that:

$$B = (AB; \theta(N_A, AB))_{RA} = (BM; \theta(N_M, MB))_{RM}$$

To know the position of the anchor B in the system RA, the processing unit 7 of the anchor A therefore calculates:

$$\widehat{AMB} = -\theta(N_M, MA) + \theta(N_M, MB)$$

$$AB = \sqrt{AM^2 + MB^2 - 2 \times AM \times MB \times \cos(\widehat{AMB})}$$

$$\widehat{BAM} = \arccos((AB^2 + Am^2 + MB^2)/(2 \times AB \times AM)) \; \theta(N_A, AB) = \theta(N_A, AM) - \widehat{BAM},$$

where
AB is the radial coordinate of the anchor B in the system RA, AM is the radial coordinate of the smartphone 2 in the system RA, MB is the radial coordinate of the anchor B in the system RM, $\theta(N_M, MA)$ is the angular coordinate of the anchor A in the system RM, $\theta(N_M, MB)$ is the angular coordinate of the anchor B in the system RM, $\theta(N_A, AB)$ is the angular coordinate of the anchor B in the system RA, $\theta(N_A, AM)$ is the angular coordinate of the smartphone 2 in the system RA.

It is therefore possible to position the smartphone 2 according to the anchor A, and to position the anchor B with respect to the smartphone 2. Thus, the system deployed by the anchor A extends to the UWB range of the smartphone 2.

Now, the case will be referred to, where the smartphone 2 is not located in UWB range of the anchor B—and is therefore located in UWB range only of the anchor A.

It is therefore possible, by using UWB technology, to measure: the distance $Dist_{MA}$ between the smartphone 2 and the anchor A, as well as the angles $Angle_{MA}$ and $Angle_{AM}$.

It is also possible, by using Wi-Fi technology, to measure the distance distmA between the smartphone 2 and the anchor A, the distance distmB between the smartphone 2 and the anchor B, and the distance distAB between the anchor A and the anchor B.

In this situation, the processing unit 7 of the anchor A evaluates, by using first UWB signals, a position $P_{MA}$ of the smartphone 2 in the system RA (which is again a polar system having, as a pole, the anchor A). The position $P_{MA}$ is therefore a polar position.

The smartphone 2 can measure the distance $Dist_{MA}$ and the angle $Angle_{AM}$. It is possible to convert these positions in the system RM into positions in the system RA, and therefore extend the system from A to the coverage zone of the smartphone 2.

The method thus consists of evaluating, by the equipment 3A integrating the anchor A and/or by the equipment 3B integrating the anchor B and/or by the smartphone 2, a position $P_B$ of the anchor B, by using second UWB signals, if the smartphone 2 is located in UWB range of the anchor B, or by alternatively using Wi-Fi signals.

In this case, the method therefore consists of evaluating a position $P_B$ of the anchor B by using Wi-Fi signals. The processing unit 7 of the anchor A thus measures, by using first Wi-Fi signals, the distance $dist_{AB}$ between the anchor A and the anchor B. Alternatively, the anchor A could control the anchor B, such that this takes this measurement.

The processing unit 7 of the anchor A thus controls the smartphone 2, such that this measures, by using second Wi-Fi signals, a distance $dist_{MB}$ between the smartphone 2 and the anchor B. Alternatively, this measurement could be taken by the anchor B.

The processing unit 7 thus evaluates the position $P_B$ from the distance $dist_{AB}$ and from the distance $dist_{MB}$.

The distance $dist_{AB}$ indeed makes it possible to draw a first imaginary circle CA around the anchor A, representing all the possible positions for the anchor B according to this measurements. Likewise, the distance $dist_{MB}$ makes it possible to draw a second imaginary circle CM around M, representing all the possible positions for the anchor B according to this measurement.

The intersections of these imaginary circles correspond only to the possible positions for the anchor B, which are the positions B1 and B2.

First, it is explained how these positions can be determined.

Figure 5:
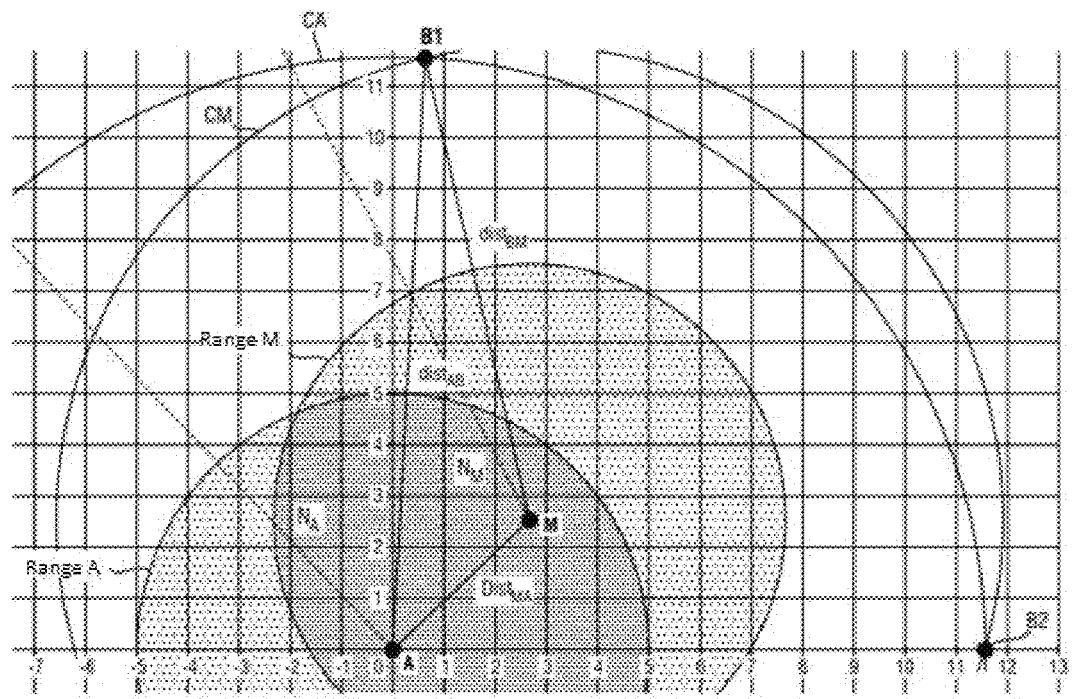
FIG. 5 is a figure similar to FIG. 4, while the smartphone is not in UWB range of the anchor B, and while there are two position options for the anchor B.

In reference to FIG. 5, CA the circle of centre A and of radius R is named CA, and the circle of centre M and of radius r is named CM.

For example, the point A is placed at the origin of the system used.

The anchor A calculates Cartesian coordinates of the smartphone 2 in a Cartesian system having the anchor A as the origin (for example, from polar coordinates, as is explained above).

The equation of the circle CA is:

$$CA (x-Ax)^2+(y-Ay)^2=R^2$$

By definition, in this case Ax=Ay=0 as A is the origin of the system A.

The equation of the circle CM is:

$$Cm: (x-Mx)^2+(y-My)^2=r^2$$

(Mx;My) are the Cartsian coordinates of the point M in the Cartesian system having the anchor A as the orign.

The pairs (x,y) are determined, which resolve this equation system. The following occurs:

$$CA: R^2 = x^2 + y^2$$

$$CM: r^2 = x^2 - 2*x*Mx + Mx^2 + y^2 - 2 \times y \times My + My^2 =$$
$$x^2 + y^2 - 2 \times x \times Mx - 2 \times y \times My + Mx^2 + My^2$$

By substitution, the following occurs:

$$CM: 0=R^2-r^2-2\times x\times Mx-2\times y\times My+Mx^2+My^2$$

The following is presented:

$$a=2\times Mx, b=2\times My, \text{ et, } c=Mx^2+My^2-r^2+R^2$$

The following is obtained:

$$CM: a\times x+b\times y-c=0 \Leftrightarrow b\times y=c-a\times x$$

$$CM: b^2\times y^2=c^2+a^2\times x^2-2\times a\times c\times x$$

By substitution with CA, the following occurs:

$$CM: b^2\times(R^2-x^2)=c^2+a^2\times x^2-2x\ a\times c\times x$$

$$CM: 0=(a^2+b^2)\times x^2-(2\times a\times c)\times x+(c^2-b^2\times R^2)$$

Therefore, the following is presented: $\Delta=(2\times a\times c)^2-4\times(a^2-b^2)\times(c^2-b^2\times r^2)$ If $\Delta<0$, there are two solutions:

$$X1 = \frac{2\times a\times c - \sqrt{\Delta}}{2\times(a^2+b^2)}$$

$$X2 = \frac{2\times a\times c + \sqrt{\Delta}}{2\times(a^2+b^2)}$$

$$Y1 = c - (a\times X1)$$

$$Y2 = c - (a\times X2)$$

The solutions are therefore (X1,Y1), which are the coordinates of B1, and (X2,Y2), which are the coordinates of B2.

If A=0, there is one solution:

$$X = \frac{a\times c}{a^2+b^2}$$

$$Y = c - (a\times X)$$

The solution is therefore the (unique) point B1 of coordinates (X,Y).

Thus, to determine the position of the anchor B, the processing unit 7 of the anchor A calculates $\Delta$, then, if $\Delta>0$, the processing unit calculates X1,X2,Y1,Y2.

The solutions are therefore the point B1 of coordinates (X1,Y1) and the point B2 of coordinates (X2,Y2): this is the situation of FIG. 5.

It is therefore seen that if A>0, it is not possible for the processing unit 7 to determine which intersection corresponds to the position of the anchor B—since two positions B1 and B2 are possibles.

Figure 6:
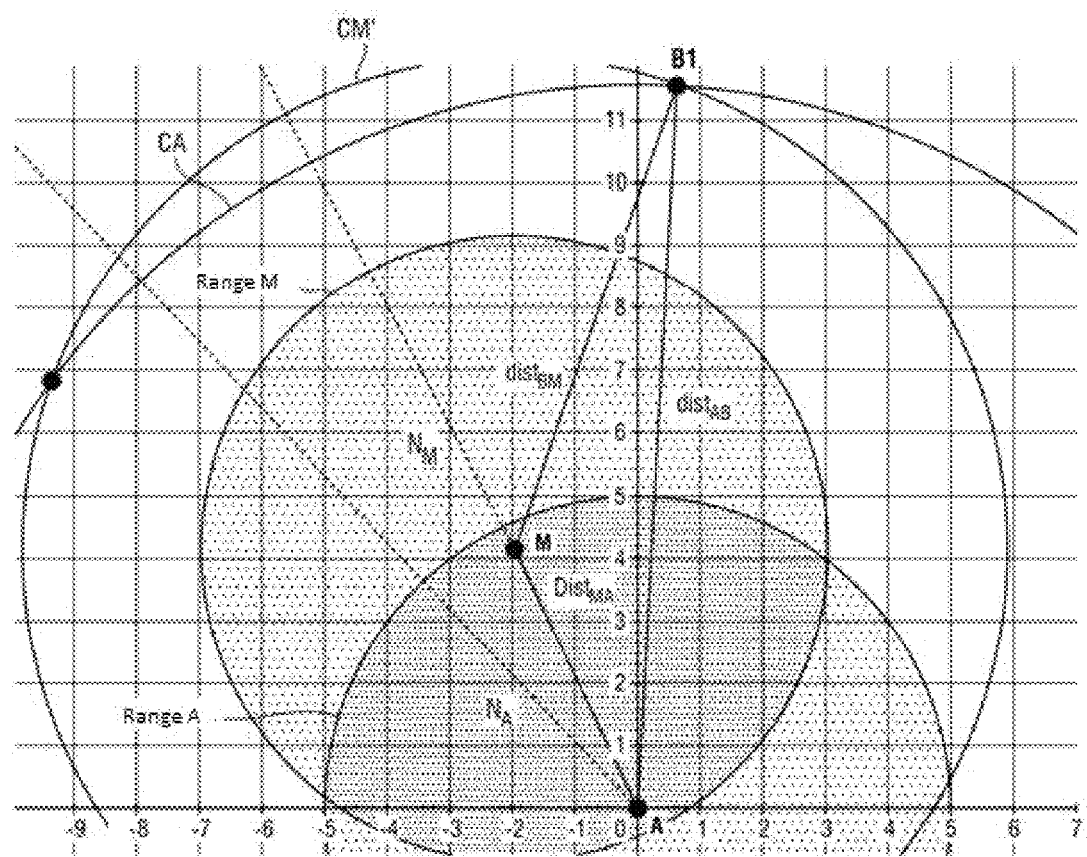
FIG. 6 is a figure similar to FIG. 5, which shows a third circle making it possible to locate the anchor B.

In reference to FIG. 6, the processing unit 7 therefore uses a third imaginary circle CM', which is defined following a change of position of the smartphone 2 (still in the UWB coverage zone of the anchor A).

One of the intersection points of the first and second circles will not have changed position with the movement of the smartphone 2. In other words, the three circles thus created necessarily cross one another at one same point.

The processing unit 7 therefore expects that the smartphone 2 changes position, or communicates (for example, via the smartphone 2), to the user of the smartphone, such that this changes position (and the smartphone 2 with them).

When the position of the smartphone 2 has changed, the processing unit 7 again measures, by the smartphone 2 or by the anchor B, by using third Wi-Fi signals, a distance $dist'_{MB}$ between the smartphone and the anchor B. The position $P_B$ is thus evaluated from the distance $dist_{AB}$, from the distance $dist_{MB}$ and from the distance $distr'_{MB}$.

The processing unit 7 defines the third imaginary circle CM', which has, as the centre, the new position of the smartphone 2 and, as the radius, the distance dist'$_{MB}$, then calculates the point where the first circle having, as the centre, the position of the anchor A and, as the radius, the distance dist$_{AB}$, the second circle, having as the centre, the position of the smartphone 2 and, as the radius, the distance dist$_{MB}$, and the third circle having, as the centre, a new position of the smartphone 2, following a movement of the smartphone 2, and, as the radius, a new distance dist'$_{MB}$ between the smartphone 2 and the anchor B following the movement of the smartphone 2 cross.

The processing unit 7 deduces from this the point which corresponds to the position of the anchor B: in this case, this is the point B1.

In the cases where Δ=0, there is only one intersection between the first circle CA and the second circle CM, which corresponds to the position P$_B$ of the anchor B.

Figure 7:
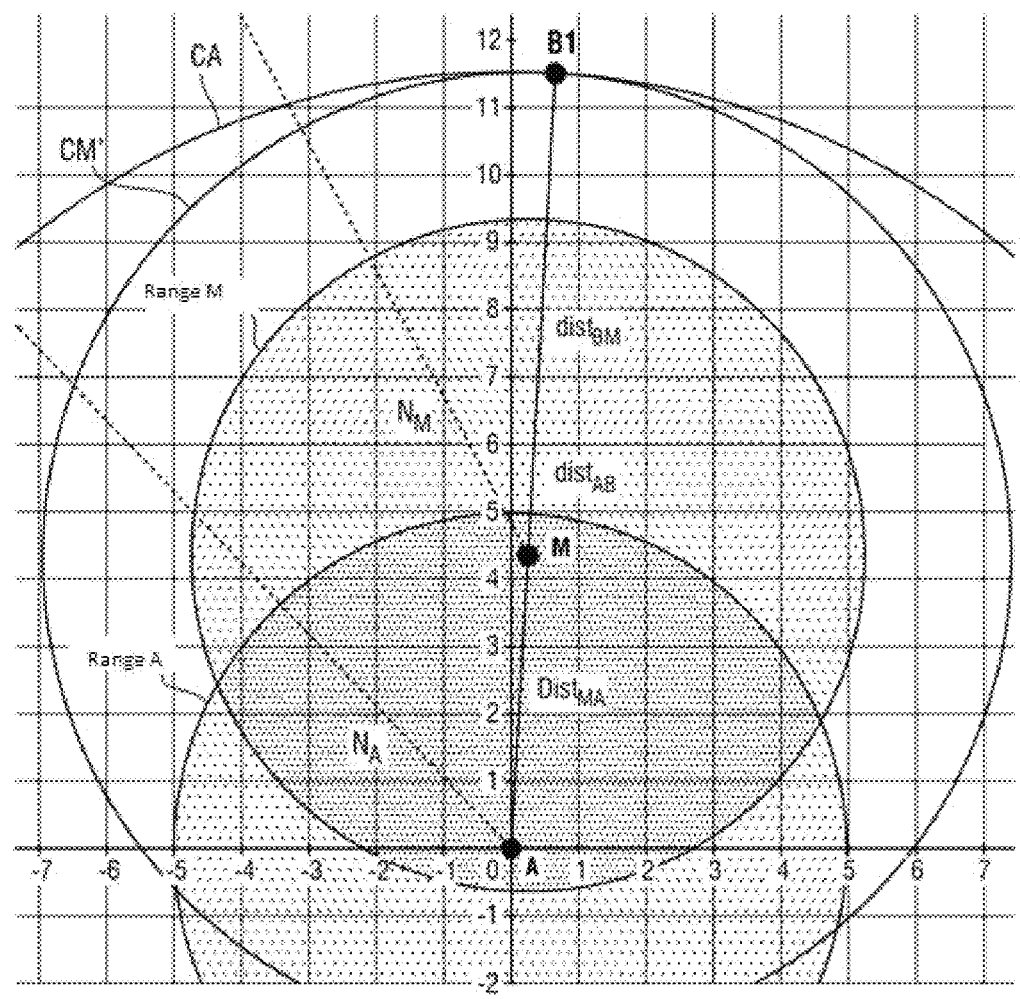
FIG. 7 is a figure similar to FIG. 5, while there is only one single position option for the anchor B.

However, the circles are very close to the proximity of this point, and it is possible that the quality of the Wi-Fi measurements do not enable a sufficient resolution: this is the case of FIG. 7.

As above, the processing unit 7 calculates the distance dist'$_{MB}$ between the smartphone 2 and the anchor B after the smartphone has changed position, and calculates the intersection point of the three circles.

The position of the anchor B is therefore known in the Cartesian system having the anchor A, as the origin.

In the embodiments described, it can occur that the processing unit 7 of the anchor A controls the smartphone or the anchor B, such that either takes the measurements (of position or of distance).

The anchor A must therefore communicate with the smartphone or with the anchor B to control them.

To transmit commands (i.e. the measurement request), different web protocols can be used, and for example: MQTT, Websockets, http, etc. In this case, Wi-Fi is used as a network.

Another option is to define a UWB message dedicated to this command.

The MQTT protocol can be used. In this protocol, clients (in this case, the anchors and the smartphone) are connected to a "broker" server, via its IP address or a URL. This server can be hosted by one or more anchors, another appliance, or in the cloud.

Each client can then subscribe to "Topics" and broadcast information in other topics (each topic is represented by a name).

When a message is broadcast in a topic, the broker redistributes it to all the clients which are subscribed to it.

These messages generally contain text, and it is therefore possible to share formatted data (for example, in JSON).

A system can therefore be imagined, wherein each anchor and the smartphone are subscribed to a certain number of topics, one of which, which makes it possible to identify them uniquely, and wherein certain messages make it possible to request a measurement.

An exchange can thus be imagined, of the form:

---

Origin: A, Topic: "M", Message = "{ "distance_UWB" : { "target" : "A", ...(other parameters) } }"
Origin: M, Topic: "Distance", Message = "{ "origin" ; "M", "target" : "A", "distance" : 5, ...(other measurements, statistics, etc.) }"

---

In this example:
A requests a measurement of distance with A in the topic "M" (topic to which only the mobile M is subscribed);
M takes a measurement of distance with A according to the parameters detailed in this message;
M shares the result of a measurement of distance between M and A in the "Distance" topic;
A, and all other clients subscribed to the "Distance" topic now know the distance between M and A.

Concerning the UWB messages, certain different methods can be used to transmit the necessary information. For example, a frame of N+1 bytes can be used, structured as follows:

Bytes 0-9:
   Bytes 0-1: "frame control", for example having the value 0x8841,
   Byte 2: sequence number,
   Bytes 3-4: abbreviated "Personal Area Network" identifier
   Bytes 5-6: abbreviated destination address
   Bytes 7-8: abbreviated origin address
   Bytes 9 et seq.: useful load
From byte 9:
   Byte 9 has, as the value, the size of the remaining message;
   Byte 10 has, as the value, a Code representing the type of message (measurement request, measurement results, different steps of the TWR, etc.);
   Bytes 11 to N have, as the values, additional data according to the type of message (stamp, measurement of distance, measurement of angle, etc.).

The steps of the positioning method are not necessarily implemented in a processing unit of equipment integrating a UWB anchor.

The steps of the positioning method can be implemented in a processing unit of mobile equipment, and for example, in a processing unit 15 of the smartphone 2 (which comprises at least one processing component and at least one memory).

In this case, the processing unit 15 is arranged to:
evaluate, by the equipment 3A integrating the anchor A, by using first UWB signals, a position P$_{MA}$ of the smartphone 2 in a system RA defined from a position of the anchor A;
evaluate, by the equipment 3A integrating the anchor A and/or by equipment 3B integrating the anchor B and/or by the smartphone 2, a position P$_B$ of the anchor B, by using second UWB signals, if the smartphone 2 is located in UWB range of the anchor B, or by alternatively using Wi-Fi signals;
deducing from the position P$_{MA}$ and from the position P$_B$, a position P$_{BA}$ of the anchor B in the system RA.

In other embodiments, a controller 16, integrated in any equipment which is not one of the anchors, nor the smartphone 2, can control the anchor A, the anchor B and the smartphone 2. This controller 16 centralises the different results of the operations performed by the anchor A, the anchor B and the smartphone 2 in order to determine the distance between the anchor A and the anchor B, and of absolutely positioning the anchor A and the anchor B.

The controller 16 thus comprises a processing unit 17 (which comprises at least one processing component and at least one memory) arranged to:
evaluate by equipment 3A which could integrate an anchor A, by using first UWB signals, a position P$_{MA}$ of the smartphone 2 in a system RA defined from a position of the anchor A;

evaluate, by the equipment 3A being able to integrate the anchor A and/or by equipment 3B being able to integrate an anchor B and/or by the smartphone 2, a position $P_B$ of the anchor B, by using second UWB signals, if the smartphone 2 is located in UWB range of the anchor B, or by alternatively using Wi-Fi signals;

deduce from the position $P_{MA}$ and from the position $P_B$, a position $P_{BA}$ of the anchor B in the system RA.

The steps of the positioning method can also be implemented in several distinct pieces of equipment.

Naturally, the invention is not limited to the embodiments described, but includes all variants within the field of the invention, such as defined by the claims.

The architecture of the UWB anchors can be different from that described in this case. The anchors are not necessarily all identical. The UWB communication modules and the Wi-Fi communication modules are not necessarily identical.

The anchors are not necessarily integrated in equipment which fulfils other functions: the anchors can be integrated in individual equipment dedicated to the anchor function. In this case, the anchor A and the anchor B are integrated in equipment which also integrates a Wi-Fi communication module.

When all or some steps of the positioning method are implemented in a processing unit of equipment integrating an anchor, the processing unit is not necessarily integrated in the anchor itself. For example, in the equipment 3A which can be seen in FIG. 1, the processing unit 7 which implements one or more steps of the positioning method can be located in the equipment 3A outside of the anchor A.

The mobile equipment is not necessarily a smartphone, but could be, for example, a smartwatch or a tablet.

The invention claimed is:

1. A method for positioning an anchor B in a system RA defined from a position of an anchor A, the anchor A and the anchor B being UWB anchors, which each comprise a UWB communication module, which are each integrated in equipment comprising a Wi-Fi communication module, and which are in Wi-Fi range from one another, the positioning method using mobile equipment comprising a UWB communication module and a Wi-Fi communication module, and which is located in UWB range at least of the anchor A and in Wi-Fi range of the anchor A and of the anchor B, the positioning method comprising the steps of:

evaluating, by the equipment integrating the anchor A, by using first UWB signals, a position $P_{MA}$ of the mobile equipment in the system RA;

evaluating, by the equipment integrating the anchor A and/or by the equipment integrating the anchor B and/or by the mobile equipment, a position $P_B$ of the anchor B, by determining if the mobile equipment is located in UWB range of the anchor B, and then by using second UWB signals if the mobile equipment is located in UWB range of the anchor B, and using Wi-Fi signals if the mobile equipment is located outside the UWB range of the anchor B;

deducing from the position PMA and from the position $P_B$, a position $P_{BA}$ of the anchor B in the system RA, wherein, if the mobile equipment is not located in UWB range of the anchor B, determining the position $P_B$ comprises the steps of:

measuring by the equipment integrating the anchor A or by the equipment integrating the anchor B, by using first Wi-Fi signals, a distance distAB between the anchor A and the anchor B;

measuring by the mobile equipment or by the equipment integrating the anchor B, by using second Wi-Fi signals, a distance $dist_{MB}$ between the mobile equipment and the anchor B;

evaluating the position $P_B$ from the distance distAB and the distance $dist_{MB}$, wherein evaluating the position $P_B$ comprises the steps of:

determining Cartesian coordinates of the mobile equipment in a Cartesian system having the anchor A as the origin;

calculating, by using the Cartesian coordinates of the mobile equipment, the intersection point between:

a first circle having, as the centre, the position of the anchor A and, as the radius, the distance $dist_{AB}$;

a second circle having, as the centre, the position of the mobile equipment and, as the radius, the distance $dist_{MB}$;

a third circle having, as the centre, a new position of the mobile equipment following a movement of the mobile equipment, and, as the radius, a new distance $dist'_{MB}$ between the mobile equipment and the anchor B following the movement of the mobile equipment.

2. The positioning method according to claim 1, wherein the system RA is a polar system having, as a pole, the anchor A, and wherein the position $P_{MA}$ is a polar position, the equipment integrating the anchor A being arranged to determine polar coordinates of the mobile equipment in the system RA, and to evaluate the position $P_{MA}$ from said polar coordinates.

3. The positioning method according to claim 2, wherein, if the mobile equipment is located in UWB range of the anchor B, the position $P_B$ is a polar position $P_{MB}$ in a system RM which is a polar system having, as a pole, the mobile equipment, the mobile equipment thus being arranged to determine polar coordinates of the anchor B in the system RM, and to evaluate the position $P_{MB}$ from said polar coordinates.

4. The positioning method according to claim 3, comprising the step, to obtain the position $P_{BA}$, to determine polar coordinates $(AB;\theta(N_A,AB))_{RA}$ of the anchor B in the system RA.

5. The positioning method according to claim 1, wherein the distance distAB and the distance distMB are estimated from respective RSSI measurements.

6. The positioning method according to claim 1, wherein each UWB communication module comprises two antennas, said UWB communication module thus being capable of measuring an angle between a straight line passing through said UWB communication module and another UWB communication module, and between a straight line orthogonal to a plane, wherein said antennas extend, said angle forming an angular coordinate of the other UWB communication module in a polar system having, as a pole, said UWB communication module.

7. A non-transitory recording medium which can be read by a computer, on which computer program comprising instructions which make a processing unit of electrical equipment executing the method according to claim 1 is recorded, wherein the electrical equipment comprising an anchor A, a Wi-Fi communication module, and the processing unit, the anchor A being a UWB anchor, the processing unit being arranged to:

evaluate, by using first UWB signals, a position PMA of mobile equipment in a system RA defined from a position of the anchor A, the mobile equipment being able to comprise a UWB communication module and a Wi-Fi communication module and being able to be located in UWB range of the anchor A and in Wi-Fi range of the anchor A;

evaluate, by the equipment integrating the anchor A and/or by equipment being able to integrate an anchor B and/or by the mobile equipment, a position PB of the anchor B, which is also a UWB anchor and which can be in Wi-Fi range of the anchor A, by determining if the mobile equipment is located in UWB range of the anchor B, and then by using second UWB signals, if the mobile equipment is located in UWB range of the anchor B, and using Wi-Fi signals if the mobile equipment is located outside the UWB range of the anchor B;

deduce from the position PMA and from the position PB, a position PBA of the anchor B in the system RA.

8. Electrical equipment comprising an anchor A, a Wi-Fi communication module, and a processing unit, the anchor A being a UWB anchor, the processing unit being arranged to:

evaluate, by using first UWB signals, a position $P_{MA}$ of mobile equipment in a system RA defined from a position of the anchor A, the mobile equipment being able to comprise a UWB communication module and a Wi-Fi communication module and being able to be located in UWB range of the anchor A and in Wi-Fi range of the anchor A;

evaluate, by the equipment integrating the anchor A and/or by equipment being able to integrate an anchor B and/or by the mobile equipment, a position $P_B$ of the anchor B, which is also a UWB anchor and which can be in Wi-Fi range of the anchor A, by determining if the mobile equipment is located in UWB range of the anchor B, and then by using second UWB signals if the mobile equipment is located in UWB range of the anchor B, and using Wi-Fi signals if the mobile equipment is located outside the UWB range of the anchor B;

deduce from the position $P_{MA}$ and from the position $P_B$, a position PBA of the anchor B in the system RA, wherein, if the mobile equipment is not located in UWB range of the anchor B. determining the position $P_B$ comprises the steps of:

measuring by the equipment integrating the anchor A or by the equipment integrating the anchor B, by using first Wi-Fi signals, a distance $dist_{AB}$ between the anchor A and the anchor B;

measuring by the mobile equipment or by the equipment integrating the anchor B, by using second Wi-Fi signals, a distance $dist_{MB}$ between the mobile equipment and the anchor B;

evaluating the position $P_B$ from the distance $dist_{AB}$ and the distance distMB, wherein evaluating the position $P_B$ comprises the steps of:

determining Cartesian coordinates of the mobile equipment in a Cartesian system having the anchor A as the origin;

calculating, by using the Cartesian coordinates of the mobile equipment, the intersection point between:

a first circle having, as the centre, the position of the anchor A and, as the radius, the distance $dist_{AB}$;

a second circle having, as the centre, the position of the mobile equipment and, as the radius, the distance $dist_{MB}$;

a third circle having, as the centre, a new position of the mobile equipment following a movement of the mobile equipment, and, as the radius, a new distance $dist'_{MB}$ between the mobile equipment and the anchor B following the movement of the mobile equipment.

9. The electrical equipment according to claim 8, the electrical equipment being a Wi-Fi extender.

10. The electrical equipment according to claim 8, the electrical equipment being a residential gateway.

11. Mobile equipment comprising a UWB communication module, a Wi-Fi communication module, and a processing unit, and which can be located in UWB range at least of an anchor A and in Wi-Fi range of the anchor A and of an anchor B, the anchor A and the anchor B being UWB anchors, the processing unit being arranged to:

evaluate, by equipment which could integrate the anchor A, by using first UWB signals, a position $P_{MA}$ of the mobile equipment in a system RA defined from a position of the anchor A;

evaluate, by the equipment which could integrate the anchor A and/or by equipment which could integrate the anchor B and/or by the mobile equipment, a position $P_B$ of the anchor B, by determining if the mobile equipment is located in UWB range of the anchor B, and then by using second UWB signals if the mobile equipment is located in UWB range of the anchor B, and using Wi-Fi signals if the mobile equipment is located outside the UWB range of the anchor B;

deduce from the position $P_{MA}$ and from the position $P_B$, a position $P_{BA}$ of the anchor B in the system RA, wherein, if the mobile equipment is not located in UWB range of the anchor B, determining the position $P_B$ comprises the steps of:

measuring by the equipment integrating the anchor A or by the equipment integrating the anchor B, by using first Wi-Fi signals, a distance distAB between the anchor A and the anchor B;

measuring by the mobile equipment or by the equipment integrating the anchor B. by using second Wi-Fi signals, a distance distMB between the mobile equipment and the anchor B;

evaluating the position $P_B$ from the distance $dist_{AB}$ and the distance $dist_{MB}$, wherein evaluating the position $P_B$ comprises the steps of:

determining Cartesian coordinates of the mobile equipment in a Cartesian system having the anchor A as the origin;

calculating, by using the Cartesian coordinates of the mobile equipment, the intersection point between:

a first circle having, as the centre, the position of the anchor A and, as the radius, the distance $dist_{AB}$;

a second circle having, as the centre, the position of the mobile equipment and, as the radius, the distance $dist_{MB}$;

a third circle having, as the centre, a new position of the mobile equipment following a movement of the mobile equipment, and, as the radius, a new distance $dist'_{MB}$ between the mobile equipment and the anchor B following the movement of the mobile equipment.

12. The mobile equipment according to claim 11, the mobile equipment being a smartphone.

13. Equipment comprising a processing unit arranged to:

evaluate by equipment which could integrate an anchor A, by using first UWB signals, a position $P_{MA}$ of mobile equipment in a system RA defined from a position of the anchor A;

evaluate, by the equipment which could integrate the anchor A and/or by equipment which could integrate an anchor B and/or by the mobile equipment, a position $P_B$ of the anchor B, by determining if the mobile equipment is located in UWB range of the anchor B, and then by using second UWB signals if the mobile equipment is located in UWB range of the anchor B, and using Wi-Fi signals if the mobile equipment is located outside the UWB range of the anchor B;

deduce from the position $P_{MA}$ and from the position $P_B$, a position $P_{BA}$ of the anchor B in the system RA, the anchor A and the anchor B being UWB anchors which can be in Wi-Fi range from one another, the mobile equipment which could comprise a UWB communication module and a Wi-Fi communication module, and which could be located in UWB range at least of the anchor A and in Wi-Fi range of the anchor A and of the anchor B, wherein, if the mobile equipment is not located in UWB range of the anchor B, determining the position $P_B$ comprises the steps of:

measuring by the equipment integrating the anchor A or by the equipment integrating the anchor B, by using first Wi-Fi signals, a distance distAB between the anchor A and the anchor B;

measuring by the mobile equipment or by the equipment integrating the anchor B, by using second Wi-Fi signals, a distance distMB between the mobile equipment and the anchor B;

evaluating the position $P_B$ from the distance $dist_{AB}$ and the distance $dist_{MB}$, wherein evaluating the position $P_B$ comprises the steps of:

determining Cartesian coordinates of the mobile equipment in a Cartesian system having the anchor A as the origin;

calculating, by using the Cartesian coordinates of the mobile equipment, the intersection point between:

a first circle having, as the centre, the position of the anchor A and, as the radius, the distance $dist_{AB}$;

a second circle having, as the centre, the position of the mobile equipment and, as the radius, the distance $dist_{MB}$;

a third circle having, as the centre, a new position of the mobile equipment following a movement of the mobile equipment, and, as the radius, a new distance $dist'_{MB}$ between the mobile equipment and the anchor B following the movement of the mobile equipment.

* * * * *